United States Patent [19]
Johnson

[11] 3,986,693
[45] Oct. 19, 1976

[54] AUXILIARY SHOCK ABSORBER MOUNTING BRACKET

[76] Inventor: Kenneth William Johnson, 5618 Bromley Way, San Diego, Calif. 92120

[22] Filed: July 23, 1975

[21] Appl. No.: 598,367

[52] U.S. Cl. .......................... 248/205 R; 188/321; 248/14; 280/662
[51] Int. Cl.² ........................................ F16F 15/00
[58] Field of Search ................ 248/200, 14, 205 R; 188/321; 267/64 R, 65 R; 280/96.2 R, 124 R, 124 A

[56] References Cited
UNITED STATES PATENTS

| | | | |
|---|---|---|---|
| 1,535,921 | 4/1925 | Lampre | 188/321 |
| 1,739,132 | 12/1929 | Flentje | 188/321 UX |
| 3,495,795 | 2/1970 | Brown | 248/221 |
| 3,679,029 | 7/1972 | Thomas | 188/321 |
| 3,799,481 | 3/1974 | Anderson | 248/15 |

*Primary Examiner*—J. Franklin Foss
*Attorney, Agent, or Firm*—Brown & Martin

[57] ABSTRACT

A mounting bracket for assembling an auxiliary shock absorber to a vehicle chassis. In use, it is bolted to the underside of the chassis I-beam. The bracket has a mounting plate, a part of the upper surface thereof confronting the underside of the I-beam. An upstanding flange abuts the I-beam and aligns the bracket with respect to the I-beam and also divides the mounting plate between its confronting and non-confronting surfaces. A pair of support plates accommodate an auxiliary shock mounting boss. A bolt is inserted through the support plates and the mounting boss. A pair of flanges are mounted edgewise to the mounting plate and extend below the mounting plate, providing structural reinforcement for the bracket.

1 Claim, 2 Drawing Figures

AUXILIARY SHOCK ABSORBER MOUNTING BRACKET

BACKGROUND OF THE INVENTION

Pick-up trucks, small vans and the like have recently grown in popularity as all-purpose vehicles. They are extensively used in businesses for a variety of tasks and have also found favor in many instances as a second vehicle for family use. Furthermore, they have found utility as campers and recreation vehicles. These vehicles are being utilized in a variety of driving conditions. They have handling characteristics that to some degree resemble an automobile and to some degree resemble a truck. The objectional characteristics that such vehicles have exhibited include scissoring on bumps and depressions, increased tire wear, tipping during sudden stops, hard steering and sway in wind and during turns.

It has been found that the use of an auxiliary shock absorber helps eliminate these problems. It has also been found that the extra shock absorber increases the dampening capacity and insures a better weight distribution for more stable braking, cornering and riding. In recognition of the desirability of auxiliary shock absorbers, several mounting brackets have been developed and are designed to mount an auxiliary shock absorber to the I-beam of the chassis. In one such bracket, the auxiliary shock absorber is bolted to a rigid mounting plate that in turn is bolted to the I-beam. Another prior art bracket includes a three sided angle bracket bolted to the I-beam. A support plate extends vertically from the angle bracket and the auxiliary shock absorber is bolted to that plate.

The deficiencies inherent in these and other prior art embodiments is that they have proven to be insufficiently rigid structurally and have failed in critical situations. Furthermore, none of the prior art devices are self-aligning, and therefore, installation is difficult. A general characteristic of shock absorber installation is that since they are located within the chassis, it is quite difficult to manipulate in what often are awkward and inconvenient positions. The auxiliary mounting bracket must be aligned perfectly so that the shock is in a position to be connected to its upper mounting brackets.

Therefore, there has been a need for an auxiliary shock mounting bracket that is of rigid and durable construction, and will not fail in critical situations. There has also been a need for an auxiliary shock absorber mounting bracket that is self-aligning to permit relatively simple installation.

SUMMARY OF THE INVENTION

It is an object of the invention to provide a new and improved bracket for mounting an auxiliary shock absorber.

Another object of the invention is to provide a new and improved bracket for mounting an auxiliary shock absorber that is reinforced for extra strength.

Another object of the invention is to provide a new and improved bracket for mounting an auxiliary shock absorber that is self-aligning.

Another object of the invention is to provide a new and improved bracket for mounting an auxiliary shock absorber that is durable, compact and simple to install.

In accordance with the above object in an exemplary embodiment of the invention, an auxiliary mounting bracket includes a main load bearing mounting plate that is bolted to the underside of the vehicle I-beam. The mounting plate has an upstanding abutment member that abuts the I-beam and aligns the bracket for proper alignment of the shock absorber. The abutment member, which may be an upstanding flange, divides the mounting plate into a surface that confronts the underside of the I-beam, and a non-confronting surface. The non-confronting surface includes a shock absorber mounting means in the form of a pair of parallel support plates mounted edgewise to the mounting plate. The support plates extend upwardly from the mounting plate and accommodates the mounting boss of the auxiliary shock absorber. The support plates have aligned holes that align with a bore in the mounting boss, and a bolt secures the mounting boss between the support plates.

A pair of reinforcing members comprising edgewise secured flanges depend from the mounting plate and provide for structural reinforcement of the bracket to prevent failure during critical situations.

In installing the auxiliary mounting bracket, the axle bolt is removed from the I-beam to free the cone spring, spring holder nut, axle nut and the cone washer. The mounting plate is placed flush against the underside of the I-beam, and the abutment member abuts a side of the I-beam. The axle bolt is inserted through a hole in the mounting bracket and it is reassembled to the spring holder nut and the axle nut.

The above and other objects of the invention will be apparent as the description continues, and when read in conjunction with the appended drawings, in which.

DETAILED DESCRIPTION OF THE DRAWINGS

Figure 1:
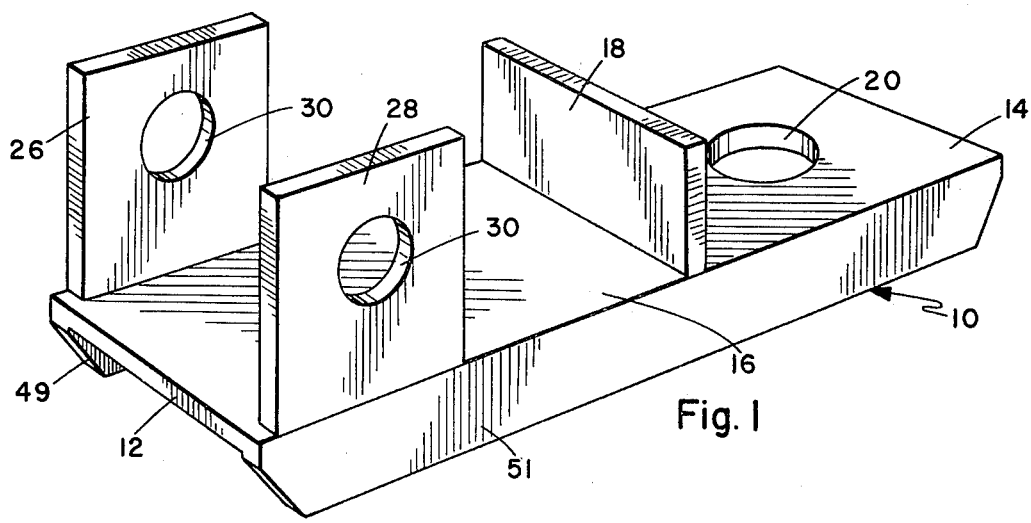
FIG. 1 is a perspective view of the bracket.
Figure 2:
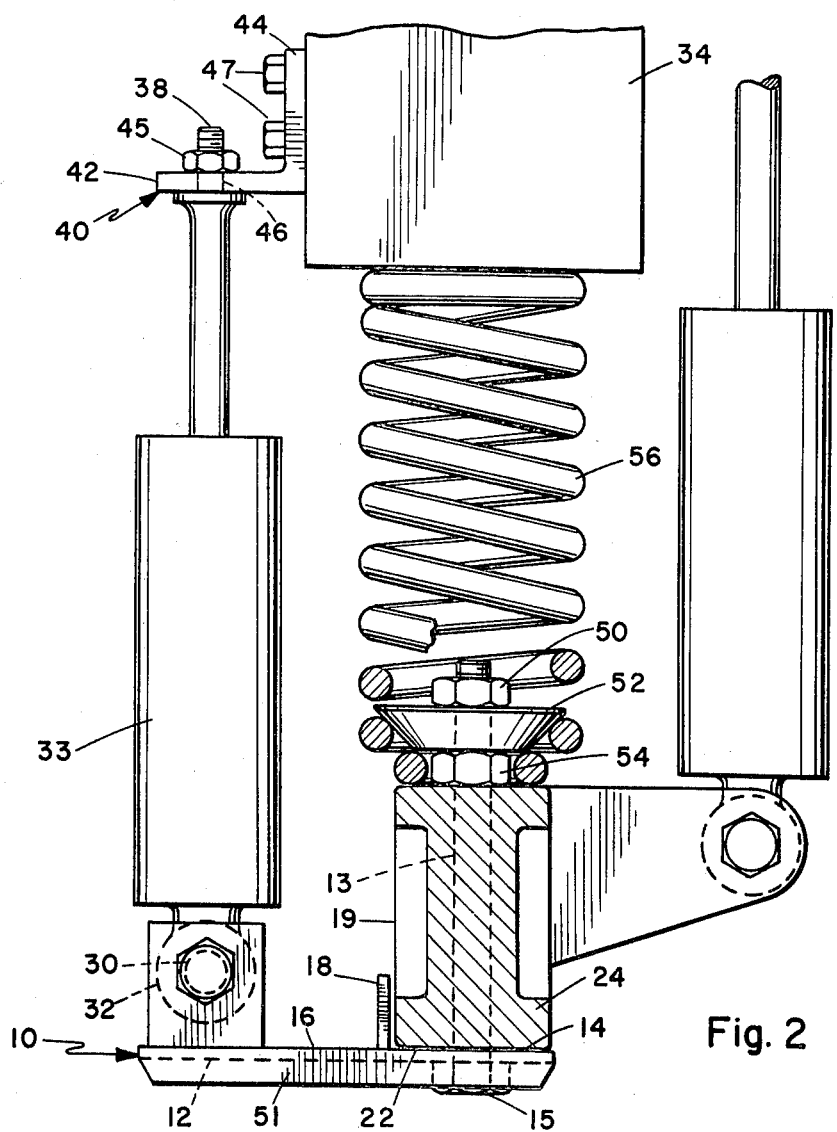
FIG. 2 is a side elevation view of the bracket in a typical installation, with portions of structure cut away.

In an exemplary embodiment of the invention, the bracket 10 has a structurally rigid mounting plate 12. The mounting plate 12 includes a hole 20. The bracket 10 is bolted, by means of bolt 15 in hole 20, to the underside 22 of I-beam 24. The bolt 15 is received in an aligned opening 13 in the I-beam 24. The confronting surface between the I-beam 24 and the mounting plate 12 is designated as 14. The non-confronting surface of the mounting plate 12 is designated as 16 and it extends outwardly from the I-beam 24. An upstanding abutment member or flange 18 extends transversely across and vertically from the mounting plate 12 and divides that mounting plate into its confronting and non-confronting surfaces 14 and 16. The flange 18 is designed to abut the surface 19 of the I-beam 24 and automatically aligns the bracket 10 with respect to the I-beam 24. This facilitates the assembling of the bracket 10 to the I-beam 24 in view of the confined space and blind areas involved in the assemblage.

A pair of upstanding support plates 26 and 28 are mounted edgewise to the non-confronting surface 16 of mounting plate 12. The support plates 26 and 28 extend upwardly and they have aligned holes 30 formed therein. The holes 30 accommodate the mounting boss 32 of an auxiliary shock absorber 33. A bolt 36 is secured through the holes 30 and through the boss 32.

An upper mounting bracket 40 is utilized to secure the upper part or lug 38 of the shock absorber 33 to the chassis part 34. The upper bracket 40 consists of orthogonally disposed arms 42 and 44. The lug 38 is received in a hole 46 in the arm 42. A nut 45 is secured on the part of lug 38 that extends through hole 46. Arm 44 of the upper bracket 40 is bolted to the chassis part 34 by means of the bolts 47. The auxiliary shock absorber 33 via this mounting structure is assembled generally vertical.

A pair of reinforcing member, in the form of edgewise mounted flanges 49 and 51 are connected to the mounting plate 12 and depend downwardly therefrom. The flanges 49 and 51 function as stiffeners and impart greater strength and rigidity to the mounting plate 12 to insure against failure during critical operating conditions. The bracket 10 thus far described may be manufactured as a unitary component or the flanges 49 and 51, the flange 18 and the support plates 26 and 28 may be welded to the mounting plate 12.

In assembling the bracket 10 to the I-beam 24, the bolt 15 is removed freeing the spring holder nut 50, the axle nut 54, the cone washer 52 and the cone spring 56. With the bolt 15 removed, the bracket 10 is placed such that the confronting surface 14 is contiguous the underside 22 of I-beam 24. The holes 20 and 13 are aligned, and the flange 18 engages the side 19 of the I-beam 24. The bolt 15 is then inserted in the holes 20 and 13 of the axle nut 54 and the spring holder nut 50 threadably engages the bolt 15. The mounting boss 32 of the auxiliary shock 33 is then assembled to the upstanding support plates 26 and 28 in the manner heretobefore described.

Many changes may be made in the invention, in the method and materials of fabrication, in the assemblage and configuration of the constituent elements, without departing from the spirit and scope of the appended claims, which changes are intended to be embraced therewithin.

Having described my invention, I now claim:

1. A shock absorber mounting bracket for mounting an auxiliary shock absorber on the underside of an I-beam suspension member with a mounting bolt received through a mounting hole in the I-beam suspension member which comprises:
   a main load bearing mounting plate fro being connected to the underside of the I-beam suspension member,
   said mounting plate having a first part forming a generally planar engagement surface adapted for being positioned against the underside of the I-beam suspension member in a confronting relationship and said first part having a vertical mounting hole therethrough adapted to receive the mounting bolt passing through the mounting hole in the I-beam suspension member,
   abutment means adjacent said first part and extending vertically upwardly from said support plate for positioning said mounting hole with respect to the mounting hole in the I-beam suspension member and for aligning said support plate generally transversely with respect to the I-beam suspension member,
   said mounting plate having a second part extending horizontally beyond the I-beam suspension member,
   a pair of spaced parallel support plates extending upwardly from said second part,
   said support plates having a pair of holes in horizontal alignment for the reception of a shock absorber mounting bolt,
   reinforcing flanges extending downwardly from the longitudinal edges of said mounting plate.

* * * * *

UNITED STATES PATENT OFFICE
CERTIFICATE OF CORRECTION

Patent No. 3,986,693　　　　Dated October 19, 1976

Inventor(s) Kenneth William Johnson

It is certified that error appears in the above-identified patent and that said Letters Patent are hereby corrected as shown below:

Column 4, line 6, in Claim 1, please change "fro" to --for--.

Signed and Sealed this

Twenty-second Day of February 1977

[SEAL]

*Attest:*

RUTH C. MASON
*Attesting Officer*

C. MARSHALL DANN
*Commissioner of Patents and Trademarks*